United States Patent
Ishizaki

(10) Patent No.: US 7,765,223 B2
(45) Date of Patent: Jul. 27, 2010

(54) DATA SEARCH METHOD AND APPARATUS FOR SAME

(75) Inventor: Takashi Ishizaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 298 days.

(21) Appl. No.: 12/076,875

(22) Filed: Mar. 25, 2008

(65) Prior Publication Data

US 2008/0250014 A1 Oct. 9, 2008

(30) Foreign Application Priority Data

Apr. 6, 2007 (JP) ............................. 2007-100573

(51) Int. Cl.
*G06F 17/30* (2006.01)
(52) U.S. Cl. ..................... 707/759; 701/209
(58) Field of Classification Search ............ None
See application file for complete search history.

(56) References Cited

U.S. PATENT DOCUMENTS

| 5,225,981 | A | | 7/1993 | Yokogawa | |
|---|---|---|---|---|---|
| 6,076,039 | A | * | 6/2000 | Kabel et al. | 701/206 |
| 6,356,887 | B1 | * | 3/2002 | Berenson et al. | 1/1 |
| 6,741,932 | B1 | * | 5/2004 | Groth et al. | 701/210 |
| 2001/0021934 | A1 | | 9/2001 | Yokoi | |
| 2001/0047279 | A1 | * | 11/2001 | Gargone | 705/1 |
| 2002/0165707 | A1 | * | 11/2002 | Call | 704/2 |
| 2005/0102278 | A1 | | 5/2005 | Okumura | |
| 2005/0228639 | A1 | | 10/2005 | Abe et al. | |
| 2007/0005564 | A1 | * | 1/2007 | Zehner | 707/2 |
| 2007/0040813 | A1 | * | 2/2007 | Kushler et al. | 345/173 |
| 2008/0098300 | A1 | * | 4/2008 | Corrales et al. | 715/243 |

FOREIGN PATENT DOCUMENTS

| JP | A-04-034644 | 2/1992 |
|---|---|---|
| JP | A-5-128153 | 5/1993 |

(Continued)

OTHER PUBLICATIONS

"Building a Geographical Ontology for Intelligent Spacial Search on the Web," by Fu et al. In: Proceedings of IASTED Int'l Conf. on Databases and Applications (2005). Available at: http://citeseerx.ist.psu.edu/viewdoc/download?doi=10.1.1.61.1033&rep=rep1&type=pdf Last Visitied: Mar. 5, 2010.*

(Continued)

*Primary Examiner*—Neveen Abel Jalil
*Assistant Examiner*—Daniel Kinsaul
(74) *Attorney, Agent, or Firm*—Posz Law Group, PLC

(57) ABSTRACT

A data search apparatus performs a data search by using a search string that has a space character included therein with a calculation of the number of target search data prior to the data search, on an assumption that at least two portions in the search string are used in an AND search. If the calculated number of the target search data exceeds a predetermined value, the space in the search string is excluded and the search string is considered as a single keyword for the data search. The data search by the above-described method yields a preferable search result in the data search apparatus having the AND search capability, because the space in the search string is excluded from an actual search string on a predetermined condition.

18 Claims, 4 Drawing Sheets

FOREIGN PATENT DOCUMENTS

JP     A-H06-149812     5/1994

OTHER PUBLICATIONS

"A Typed Text Retrieval Query Language for XML Documents," by Colazzo et al. (2000). Available at: http://citeseerx.ist.psu.edu/viewdoc/download?doi=10.1.1.95.9837&rep=rep1&type=pdf Last visited: Mar. 5, 2010.*

Office Action dated Nov. 26, 2008 in corresponding Japanese patent application No. 2007-100573 (and English translation).

Extended European Search Report issued from the European Patent Office on Jul. 4, 2008 for the corresponding European patent application No. 08004602.2-1225.

"Improved Method for Help Lookups", *IBM Technical Disclosure Bulletin*, vol. 29, No. 1, Jun. 1986, pp. 291-292.

* cited by examiner

DATA SEARCH METHOD AND APPARATUS FOR SAME

CROSS REFERENCE TO RELATED APPLICATION

The present application is based on and claims the benefit of priority of Japanese Patent Application No. 2007-100573 filed on Apr. 6, 2007, the disclosure of which is incorporated herein by reference.

FIELD OF THE INVENTION

The present disclosure generally relates to a data search method and apparatus for use in a vehicle.

BACKGROUND INFORMATION

Conventionally, a user of a database searches for desired data by inputting a keyword (i.e., a string of characters) that is utilized for extraction of the data from the database. The number of keywords may be only one word, or may be plural number of words depending on a situation. When the plural number of words are used for data search, the data is searched by either matching all of the keywords (AND search) or matching one or more of the plural keywords (OR search). The search may also performed by combining the AND search and the OR search. The search method described above is, for example, disclosed in Japanese patent document JP-A-H05-128153.

The AND search combines the plural keywords by using "AND" or "&." In this case, the keywords input looks like "XXX AND YYY" or "XXX & YYY."

Some of the vehicle navigation systems search for a destination or the like by using a search method with the AND search capability (e.g., an enhanced search function) for facilitating the destination search by a user who does not have a clear memory of, for example, a previously visited place. The search method utilizes the AND search capability to easily find the visited place by combining plural keywords of place name and a restaurant category. That is, the destination may be search for by inputting "Washington D.C." together with a restaurant category of "Chinese" or the like.

The AND search may be performed, in some cases, by "combining" the plural keywords by the space. That is, in other words, some of the databases implement the AND search capability in a format that combines plural keywords separated by spaces in the keyword input instead of using "AND," or "&," or other expressions.

However, when the keywords looks, for example, like "A MART" for the data search of a shop having a name "A," the data search function in the database may falsely determine that the user likes to perform the AND search by using both of the keywords "A" and "MART." When the data search is performed with a very short keyword string or the like, the search result may list a large number of searched items to be scrolled through again, or the search itself may take a very long time due to a huge amount of data that fulfills the AND condition of the short keywords.

SUMMARY OF THE INVENTION

In view of the above and other problems, the present disclosure provides a search method that excludes a space in a search string on a predetermined condition for facilitating a data search with an AND search capability. The search method may also be realized as a data search apparatus or a navigation apparatus. In other words, the search method and the apparatus prevent a user from being involved in an unintended AND search by an input of keywords that are separated by the space.

When a character string for a search including the space is provided by a user, the character string is examined whether the string fulfills a preset condition, and the search is performed with the string that excludes the space when the condition is fulfilled. Therefore, when a string "A/MART" ("/" represents a space hereinafter) is input as the character string for the search instead of "AMART" for a purpose of searching for a shop having a name "AMART," the character string "A/MART" is handled as a search string "AMART" (i.e., the space is excluded from the string), thereby, without explicitly specifying the AND search, enabling an acquisition of desired search data that is intended by a user who habitually or inadvertently inputs a space in the search string.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
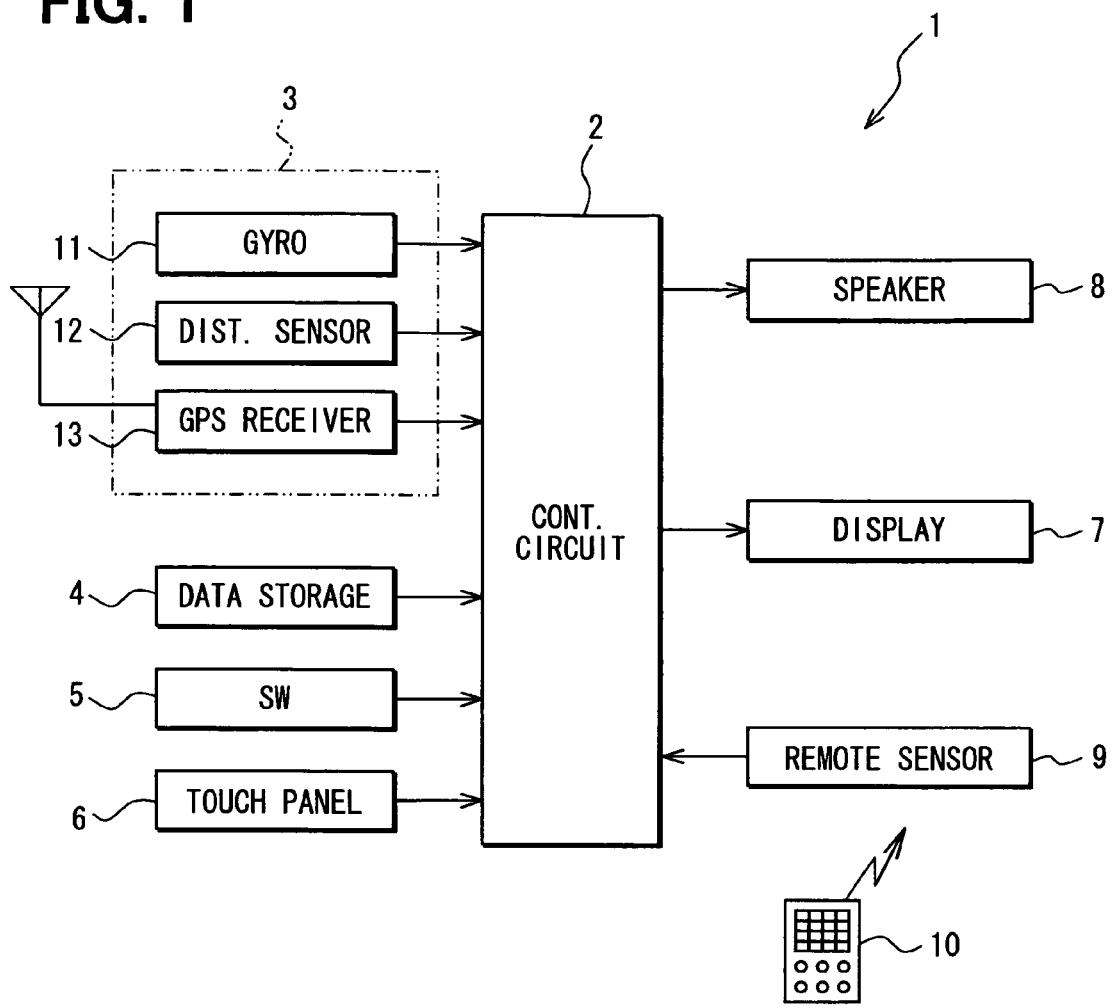
FIG. 1 shows a block diagram a navigation apparatus in an embodiment of the present disclosure.

One embodiment of the present invention is explained based on the drawing as follows. FIG. 1 is a block diagram showing electric configuration of a vehicle navigation apparatus 1. The vehicle navigation apparatus 1 has a control circuit 2 for the control of the apparatus, a position sensing device 3 as a position sensing unit, a data storage device 4 as a data storage unit, an operation switch group 5, a touch panel 6, a display unit 7 as a display device, a speaker 8, a wireless remote controller sensor 9, a wireless remote controller 10 paired with the remote controller sensor 9 and the like.

The control circuit 2 has a function to control the entire operation of the vehicle navigation apparatus 1, and the control circuit 2 uses a microcomputer as its main part. That is, the control circuit 2 has a CPU, a ROM, a RAM, an I/O, buses to interconnect these parts (none of them are illustrated), and the like. Among these parts, the ROM stores an execution program to operate the vehicle navigation apparatus 1, and the RAM temporarily stores map data acquired from the data storage 4, temporary data for program execution and the like.

The position sensing device 3 includes of a gyroscope 11, a range sensor 12 and a GPS receiver 13. Because these sensors 11-13 have detection error of different property, the sensors 11-13 can be combined for higher accuracy of position detection by mutual compensation. In addition, it is not necessary to always use all of the sensors 11-13 depending on required detection accuracy, that is, some of the sensors among those may be selected for use. Furthermore, wheel sensors detecting the rotation of each tire and/or a rotary sensor detecting the rotation of the steering wheel may also be employed as a part of the position sensing device 3.

For example, the data storage 4 includes an information recording medium such as DVD-ROM and an information reader reading data from the information recording medium, and data are read from the information recording medium by the reader to be input into the control circuit 2. In this case, the data storage 4 stores map data, data for map matching, sound data to voice guide a course, position data to search for a position (coordinates) in the map from the addresses and/or a name of a facility, keyword search data to search for a location by a keyword, genre data to search for a destination according to a genre, and the like. In addition, the position data described above is used for the location search that searches a location of a departure place, a stop-by place, and a destination upon having an input of its address, a building name, a facility name, an intersection name, a telephone number or the like. The data is, thus, formulated as a combination of the address, the building name, the facility name, the intersection name, and the telephone number with the corresponding coordinates of the map.

The display unit 7 includes a liquid crystal display as a display screen that displays map data, a letter, signs, and the like, and, a transparent touch panel 6 is stuck on the surface of the liquid crystal display. The operation switch group 5, the touch panel 6, and the wireless remote controller 10 serve as an input unit that inputs data, setting items, and various inputs regarding destination setting. The operation switch group 5 includes button switches which, for example, are disposed around the liquid crystal display.

The control circuit 2 provides a function as the display control unit, and calculates the current position of the vehicle based on information input from the position sensing device 3, and displays a road map around the current position based on the map data on the liquid crystal display of the display unit 7, and also displays a pointer which shows the current position of the vehicle and a progress direction on the displayed road map. The scale of the road map displayed on the display screen can be changed by an operation of the operation switch group 5.

The control circuit 2 has a function to set the course to the destination and a function to provide guidance that directs by a sound the course of the vehicle to be output from the speaker 8. That is, when the operation switch group 5, the touch panel 6 or the wireless remote controller 10 is operated to set a destination or a stop-by place, optimal paths from the current position to the destination are automatically searched for as guidance courses, and the guidance courses are displayed with a color that is different from the normal road color on the road map displayed on the liquid crystal display of the display unit 7. Further, the control circuit 2 outputs the directions or the like by voice based on the guidance course. In addition, as a method to set the optimal path, Dijkstra method or the like may be used.

Figure 2:
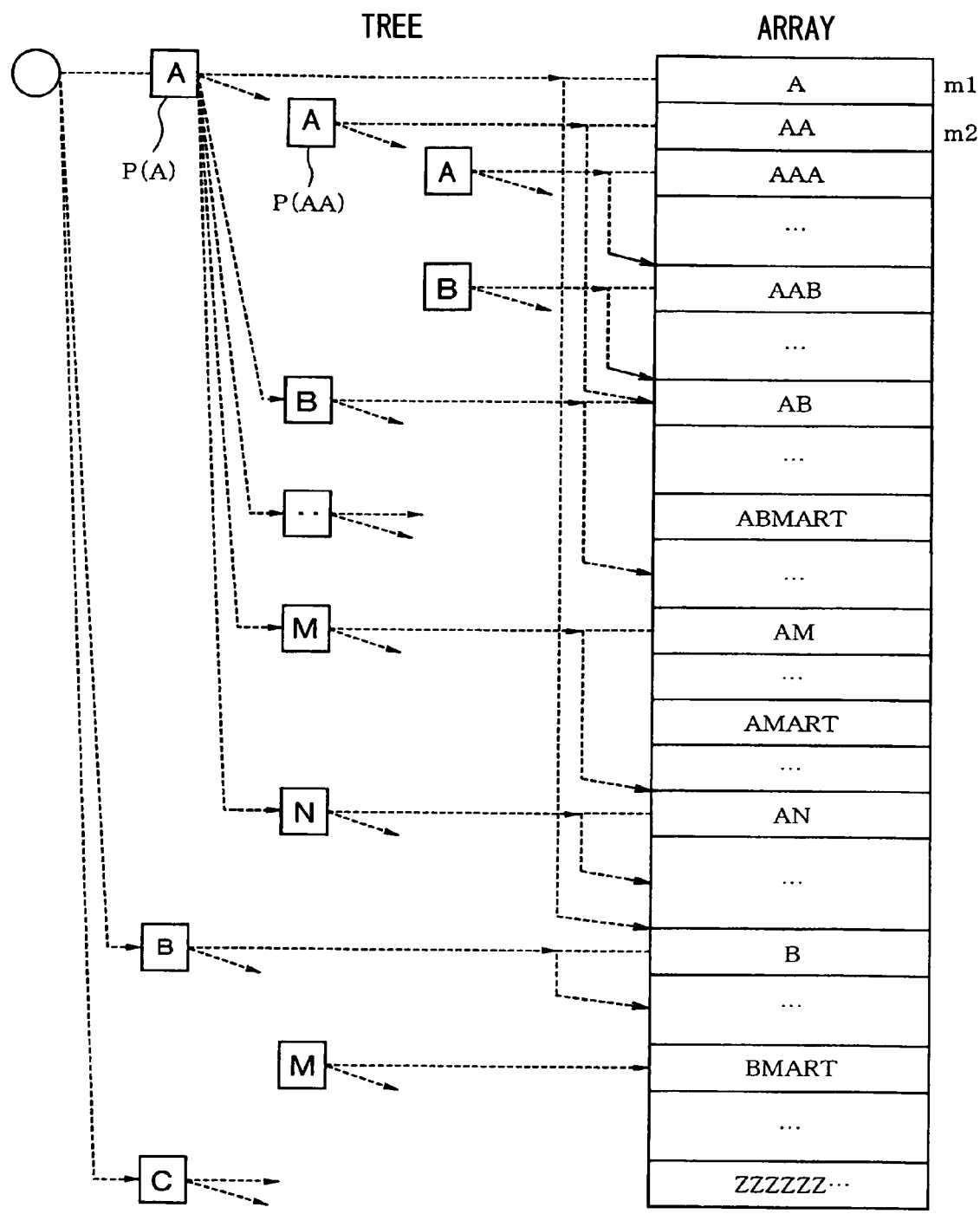
FIG. 2 shows an illustration of a data structure for use in a keyword search.

The data structure of keyword search data stored in the storage 4 is shown in FIG. 2. Hierarchical structure is used for the keyword search data (i.e., so-called tree structure), and the structure has a tree part and an array part. In the array part, all kinds of facilities in the map data are stored (i.e., listed) in the alphabetical order by the name that is spelled out in alphabet. The listed items are, for example, a public park, an amusement park, a golf course, a restaurant, a hotel, a part store, government offices, a building, a railroad station, a sea port, an airport and the like.

In other words, alphabetically listed data of all kinds of facilities is grouped hierarchically by the first letter of the name, then by the second letter, and by the third letter. That is, in a group of the first letter sameness, the facility names are divided into sub-groups by the second letter of the name. Then, in a group of the second letter sameness, the group is further divided into second level sub-groups by the third letter of the name. In addition, when the number of data in a group becomes smaller than a certain value, the group of data is stored without being divided into smaller groups.

The above tree part has a data element that indicates a top position of corresponding array part and a data element that indicates the number of facility name data corresponding array part is an array part of a facility name data group of first n th letter sameness, that is, the first alphabet sameness group, the first and second alphabet sameness group, and so on.

For example, the tree part of the facility name data group having "A" as the first letter (A array part) is an A array tree part as shown as P(A) in FIG. 2. Likewise, the tree part of the facility name data group having "A" as the first letter and "A" as the second letter (AA array part) is an AA array tree part as shown as P(AA) in FIG. 2. The A array tree part has both of top position data m1 of the A array part and the number of the facility name data of the A array part. In addition, the AA array tree part has top position data m2 of the AA array part and both data of the number of the facility name data of the AA array part.

When keyword search data is searched, the control circuit 2 performs an AND search or a single keyword search. In addition, an OR search may be also be performed. Whether the AND search or the single keyword search is performed is determined based on a condition whether there is a space in the character string input as the search string. That is, when there is a space, the AND search is performed.

The AND search is defined as a search that uses both of the character string (the "character string" includes a case where only one character in the string) before and after the space as keywords to be searched. The facility name data having all of plural keywords is picked up from the search data. Therefore, at first, in the AND search, one of the plural keywords is used for the search of the facility name data having the first keyword, for example, and in the above searched data, the rest of the plural keywords is used for the search for complete matching of all keywords. In addition, a single keyword search is performed when the character string for the search does not have a space. That is, the single keyword search is defined as a search that uses a series of characters as a string for the search, and the keyword is used to perform the search that searches the facility name data having the keyword included therein.

Figure 4:
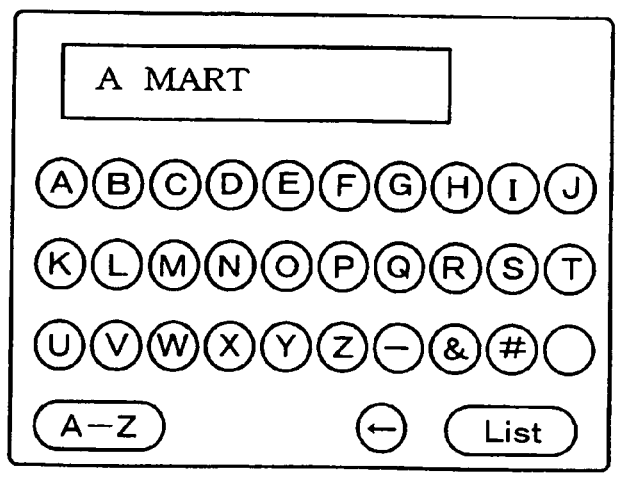
FIG. 4 shows an illustration of an input screen for inputting character strings to the navigation system.
Figure 3:
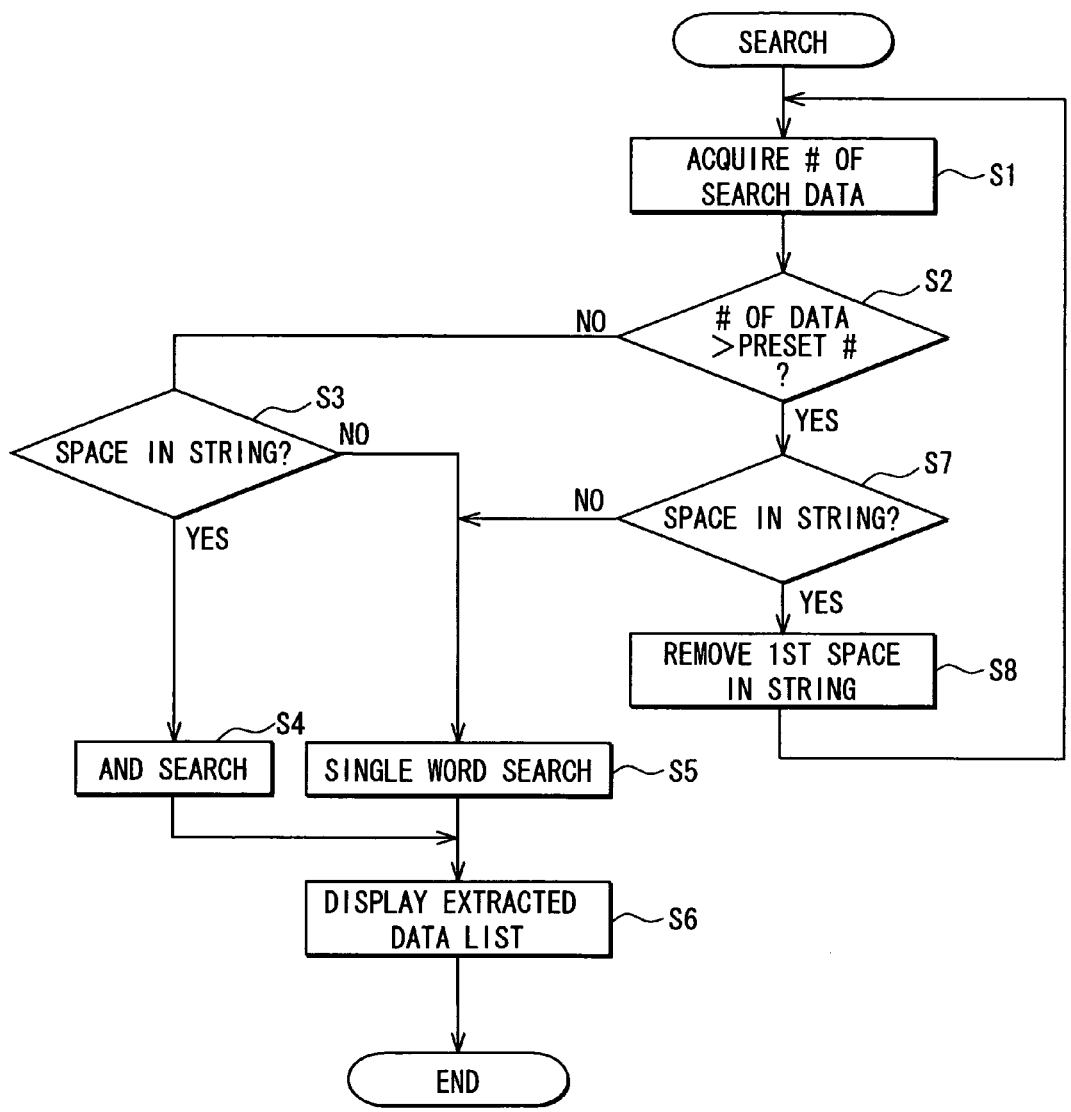
FIG. 3 shows a flowchart of a search process in the navigation apparatus.

The searched case of the destination (a place) is explained with the data for the keyword search of the above configuration next while referring to a flowchart of FIG. 3. First, a user operates the touch panel 6 according to the display screen of the display unit 7, and has indicated that he/she performs a destination search by using a keyword search. Then, the control circuit 2 displays the alphabet as shown in FIG. 4 on the display screen of the display unit 7. Then, the user inputs the keyword of the destination to be searched for while he/she operates the touch panel 6 as a character string input device to input the keywords of the destination by watching the alphabet on the display screen. In the present embodiment, the user is assumed to be searching for the store having the name "AMART," and is further assumed that ha/she has inserted a space in the keyword, that is, the keyword looks like "A/MART" in a course of actual input.

Then, after an input of the search string (a character string for search is provided), the control circuit 2 accesses the keyword search data, and the number of the search object data is acquired (step S1 of FIG. 3, a data number acquisition unit). The acquisition of the number of the search object data is performed as follows. That is, because a space is inserted in the search string "A/MART," the control circuit 2 acquires the number of the search object data for the AND search that uses both of "A" and "MART" before and after the space as keywords for the search. Because the character string to represent the facility name is, for example, specified first by the first keyword "A" among other keywords, the control circuit 2 acquires the number of the facility name data in the array tree part of the first letter "A" (the A array tree part) from the tree part. The number of the acquired facility name data is used as the number of the AND search object data by the keywords of "A" and "MART." In addition, when the number of the search object data in the AND search is acquired, the number of the facility name data may be calculated as the number of the search object data of the facility name data beginning with the second keyword among the plural keywords.

The control circuit 2 determines, after the acquisition of the search object data, whether the number of the search object data exceeds a predetermined value (step S2, a determination unit). When the number of the search object data is equal to or less than a predetermined number, (step S2: NO), the control circuit 2 determines whether there is a space in the character string for the search (step S3). Because there is a space in the string "A/MART," the control circuit 2 determines in step S3 as "YES," and performs the AND search by using two keywords of "A" and "MART" successively (step S4, a search unit).

The object data for the AND search at this point is a group of the facility name data that is derived from the array tree part at the time of the acquisition of the number of the search object data. In other words, based on both of the top position of the corresponding array part in the array tree part (the A array part) and the number of the facility name data, the top position and the last position of the corresponding array part (the A array part) can be acquired, thereby determining the facility name data in the corresponding array data part as the search object data. Then, the control circuit 2 which performed the AND search lists the facility name data being extracted by the search on the display screen of the display unit 7 (step S6). In this case, the AND search in the data in FIG. 2 yields "ABMART" and "AMART" to be listed on the screen.

On the other hand, when the number of data is determined to exceeds the predetermined value (step S2: YES), the control circuit 2 determines whether there is a space in the character string for the search (step S7), and replaces the search string with a new string that excludes the first space in the search string (step S8, a replace unit) when the space is found in the string (step S7: YES). That is, when the string of "A/MART" is used, only one space is excluded to have the new string "AMART" (a new character string for the search).

Then, the control circuit 2 returns to step S1, and the number of the search object data is acquired. In this case, because "AMART" is the keyword, that is, the single keyword search is to be performed, the number of the search object data is calculated as the number of the facility name data having the character string of "AMART" in the present order as the first and subsequent letters in the string. The number of data is thus acquired the number of the facility name data in the AMART array tree part.

The control circuit 2 determines the number of the search object data in step S2 after having acquired the number of the search object data, and, if the number of the search object data exceeds the predetermined value, the process of the flowchart proceeds to step S7 after determining that step S2 is "YES." In addition, when the number of the search object data is equal to or smaller than a predetermined number, the control circuit 2 determines that step S2 is "NO," and the process proceeds to step S3. Then, the control circuit 2 determines whether there is a space in the character string for the search in step S7 or in step S3.

The control circuit 2 performs the single keyword search assuming that "AMART" is the keyword in step S5, because the space in the search string has already been excluded from the string (NO in step S3, and NO in step S7). The object data of the single keyword search is the facility name data group to be acquired from the data (the top position and the data number of the array part) in the array tree part (an AMART array tree part) at the time when the number of the search object data is acquired. Then, the control circuit 2 which has performed the single keyword search displays the searched facility name data on the display screen of the display unit 7 (step S6). In the example of FIG. 2, the string "AMART" only is searched for in the single keyword search of the data, and the string is displayed on the display screen.

In addition, if the search string originally input for performing the search has two or more spaces, one space at a top of the string is excluded from the string by the first execution of step S8. Then, as step 8 is executed subsequently, one space at a time is excluded from the string. That is, in other words, the spaces in the original search string are excluded one by one from the top of the string toward the end of the string.

When the extracted facility name data is displayed on the display unit 7 either by the single keyword search or the AND search, the user chooses a desired facility name from the displayed facility names. Then, the control circuit 2 displays the position of the facility concerned on the map displayed on the display unit 7 by referring to the position data to search for the position of the facility in the map.

When a space is inserted in the search string as described in the present embodiment, the number of the search object data in the AND search is acquired, and the AND search is actually carried out if the number of the search object data is smaller than the predetermined value. Therefore, because the number of the search object data is limited in this case, a turn around time of the AND search is expected to be within a certain period of time, and the number of the facility name data extracted as a result of the search is also expected to be within a certain range.

Further, when the number of the search object data from the AND search exceeds a predetermined value, the increase of the data number is considered to be mainly caused by the smallness of the number of the characters in a proper noun in such a case that the search string is a combination of a proper noun (e.g., "A") and a common noun (e.g., "MART"), that is, "A/MART" or the like. Therefore, the space is excluded to perform the single keyword search when the increase of the search object data is expected. As a result, the search can be finished comparatively in a short time, and there are only a few numbers of the facility name data to be extracted by the search, thereby enabling the user to easily find the facility that has been looked for.

Furthermore, when the user inputs a string of "A/MART," the intention of the user is highly probably finding a shop having a name "AMART," instead of finding a shop having a name "AB" in the shop name that can be searched for by the AND search. Therefore, exclusion of the space from the search string "A/MART" reasonably facilitates the keyword search.

Figure 5:
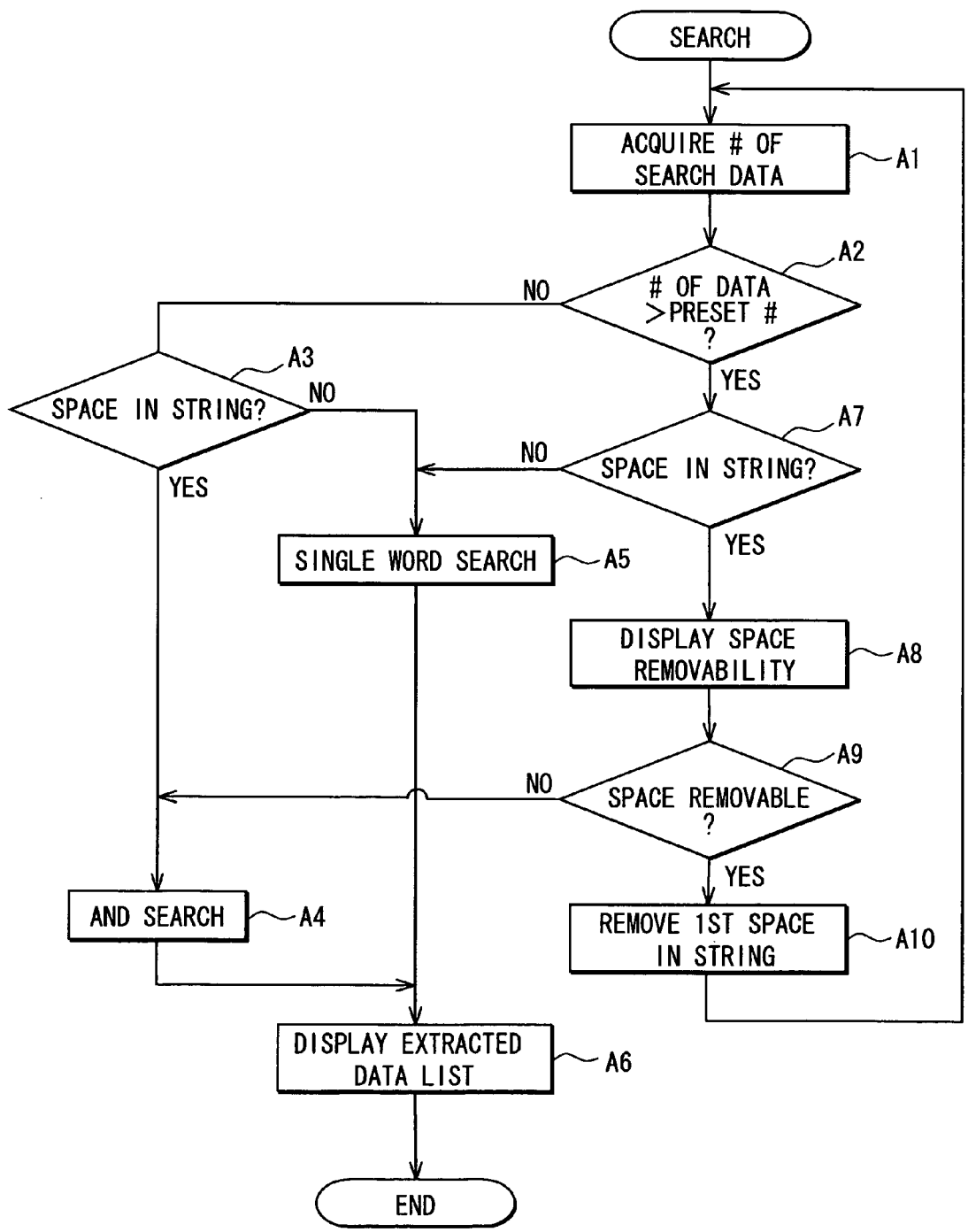
FIG. 5 shows a flowchart of a search process in another embodiment of the present disclosure.

FIG. 5 shows another embodiment of the present invention. The difference of the another embodiment from the one described above is that a user is inquired whether or not to exclude the space prior to the exclusion in the present embodiment. That is, the inquiry screen whether or not the control circuit 2 excludes the space is displayed on the display unit 7 (step A8, an inquiry unit) when the number of the search object data exceeds a predetermined value and there is a space in the search string (YES in step A2, then YES in step A7). Then, the control circuit 2 excludes the space (step A10) when the user operates the touch panel 6 serving as an answer unit to input "YES" for the inquiry (step A9: YES). When the user inputs "NO" for the answer (step A9: NO), the control circuit 2 performs the AND search (step A4). Thus, the present embodiment prevents an unwanted single keyword search to be carried out by inquiring whether or not to perform the space exclusion prior to the exclusion operation.

Although the present invention has been fully described in connection with the preferred embodiment thereof with reference to the accompanying drawings, it is to be noted that various changes and modifications will become apparent to those skilled in the art.

For example, the predetermined condition to exclude the space from the search string may be based on a different criterion from the criterion of the number of the search object data.

The keyword search may be used for a genre search, an address search or the like besides the facility search.

The above search scheme may be applied generally to a data search of other purposes besides the search in the vehicle navigation apparatus 1.

Such changes and modifications are to be understood as being within the scope of the present invention as defined by the appended claims.

What is claimed is:

1. A data search method comprising:
providing, for use in a data search, a search string that includes a space; and
searching a data storage for data by performing an AND search that matches all of keywords in front of the space and behind the space in the search string with the data, wherein
the data search is performed by keywords having the space in the search string excluded therefrom when a preset condition for the search string that includes the space is fulfilled, and
the preset condition is fulfillment of a first condition and a second condition, the first condition defined as acquisition of a number of data in the data storage, the data including one string in front of or behind the space in the search string is acquired as a number of search object data, and the second condition defined as the acquired number of data in the first condition exceeding a predetermined threshold.

2. The data search method of claim 1, wherein,
when the search string includes at least two spaces, one space closer to a top of the search string is excluded from the search string when a preset condition is fulfilled, and
when the preset condition is yet fulfilled after excluding the space from the search string, a rest of the spaces in the search string is excluded from the search string one by one from a top side of the search string.

3. The data search method of claim 1, wherein
the data in the data storage has a tree structure and each of tree elements stores the number of data included in corresponding arrangement of the tree element, and
the number of search object data is acquired by acquiring the number of data from the tree element that includes a front string from among the strings in front of or behind the space in the search string.

4. The data search method of claim 1, wherein
space exclusion from the search string is inquired prior to a performance of the space exclusion, and
the space exclusion is performed only when inquired space exclusion has an affirmative answer.

5. The data search method of claim 1, wherein
the data search by the data search method is used for a location search in a navigation apparatus.

6. A data search apparatus comprising:
a data storage and a processor executing a program that comprises:
an input unit capable of inputting a search string;
a search unit capable of searching the data storage for data that includes keywords when the search string specifies keywords, wherein the search unit searches for the data among plural number of data stored in the data storage by performing an AND search, and wherein the AND search searches for the data that matches with all of the keywords in front of a space and behind the space in the search string when the search string includes the space;
a data number acquisition unit capable of acquiring a number of search object data, the data including one string in front of or behind the space in the search string;
a determination unit capable of determining whether or not the number of data acquired by the data number acquisition unit exceeds a predetermined threshold, and whether or not the search string having the space fulfills a preset condition; and
a replace unit capable of replacing the search string with a new string that excludes the space contained in the search string upon having determination that the preset condition is fulfilled by the determination unit, wherein
the search unit searches the data storage for the data that includes keywords derived from the new string that has the space excluded therefrom when the space is excluded from the search string.

7. The data search apparatus of claim 6, wherein
the replace unit excludes the space in the search string from a top side of the search string one by one every time the preset condition is fulfilled on a condition that the search string includes plural spaces, and
the determination unit determines, every time the space is excluded from the search string upon determining that the preset condition is fulfilled, whether the preset condition is yet fulfilled when the search string input by the input unit has the plural spaces.

8. The data search apparatus of claim 6 further comprising:
the data in the data storage has a tree structure and each of tree elements stores the number of data included in corresponding arrangement of the tree element, and
the data number acquisition unit acquires the number of data from the tree element that includes a front string from among the strings in front of or behind the space in the search string.

9. The data search apparatus of claim 6 further comprising:
an inquiry unit capable of inquiring whether to exclude the space upon having determination by the determination unit that the preset condition for excluding the space is fulfilled, and
an answer unit capable of inputting an answer for the inquiring by the inquiry unit, wherein
the replace unit excludes the space if the answer unit inputs the answer that affirms exclusion of the space.

10. A navigation apparatus comprising:
a data search apparatus of claim 6, wherein
the data search apparatus performs a location search.

11. The data search method of claim 2, wherein
the data in the data storage has a tree structure and each of tree elements stores the number of data included in corresponding arrangement of the tree element, and
the number of search object data is acquired by acquiring the number of data from the tree element that includes a front string from among the strings in front of or behind the space in the search string.

12. The data search method of claim 2, wherein
space exclusion from the search string is inquired prior to a performance of the space exclusion, and
the space exclusion is performed only when inquired space exclusion has an affirmative answer.

13. The data search method of claim 3, wherein
space exclusion from the search string is inquired prior to a performance of the space exclusion, and
the space exclusion is performed only when inquired space exclusion has an affirmative answer.

14. The data search method of claim 2, wherein
the data search by the data search method is used for a location search in a navigation apparatus.

15. The data search method of claim 3, wherein
the data search by the data search method is used for a location search in a navigation apparatus.

16. The data search apparatus of claim 7 further comprising:
the data in the data storage has a tree structure and each of tree elements stores the number of data included in corresponding arrangement of the tree element, and
the data number acquisition unit acquires the number of data from the tree element that includes a front string from among the strings in front of or behind the space in the search string.

17. The data search apparatus of claim 7 further comprising:
an inquiry unit capable of inquiring whether to exclude the space upon having determination by the determination unit that the preset condition for excluding the space is fulfilled, and
an answer unit capable of inputting an answer for the inquiring by the inquiry unit, wherein
the replace unit excludes the space if the answer unit inputs the answer that affirms exclusion of the space.

18. A navigation apparatus comprising:
a data search apparatus of claim 7, wherein
the data search apparatus performs a location search.

* * * * *